United States Patent
Shibata et al.

(10) Patent No.: US 10,287,426 B2
(45) Date of Patent: May 14, 2019

(54) THERMOPLASTIC RESIN COMPOSITION, METHOD FOR PRODUCING SAME, AND MOLDED ARTICLE OF SAME

(71) Applicant: TORAY INDUSTRIES, INC., Tokyo (JP)

(72) Inventors: Takuya Shibata, Ichihara (JP); Noboru Watanuki, Ichihara (JP); Takanori Suga, Ichihara (JP); Saburo Shioda, Tokyo (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/529,916

(22) PCT Filed: Dec. 15, 2015

(86) PCT No.: PCT/JP2015/085108
§ 371 (c)(1),
(2) Date: May 25, 2017

(87) PCT Pub. No.: WO2016/104259
PCT Pub. Date: Jun. 30, 2016

(65) Prior Publication Data
US 2017/0327680 A1    Nov. 16, 2017

(30) Foreign Application Priority Data

Dec. 25, 2014    (JP) ................. 2014-261792

(51) Int. Cl.
| | |
|---|---|
| *C08L 33/12* | (2006.01) |
| *C08L 51/04* | (2006.01) |
| *C08L 33/20* | (2006.01) |
| *C08F 220/14* | (2006.01) |

(52) U.S. Cl.
CPC ............. *C08L 33/12* (2013.01); *C08L 33/20* (2013.01); *C08L 51/04* (2013.01); *C08F 220/14* (2013.01); *C08J 2409/00* (2013.01); *C08L 2205/02* (2013.01)
(Continued)

(58) Field of Classification Search
CPC ....... C08L 51/04; C08F 220/14; C08F 220/44
See application file for complete search history.

(56) References Cited

U.S. PATENT DOCUMENTS

| | | |
|---|---|---|
| 2002/0042476 A1 | 4/2002 | Kido et al. |
| 2002/0120062 A1 | 8/2002 | Nagahara et al. |

FOREIGN PATENT DOCUMENTS

| | | |
|---|---|---|
| JP | 9-157470 A | 6/1997 |
| JP | 2002-128848 A | 5/2002 |

(Continued)

OTHER PUBLICATIONS

Scheirs et al. Modern Styrenic Polymers (Year: 2003).*
(Continued)

*Primary Examiner* — Mark S Kaucher
(74) *Attorney, Agent, or Firm* — Birch, Stewart, Kolasch & Birch LLP

(57) ABSTRACT

A thermoplastic resin composition having an excellent moldability capable of producing a molded article having excellent chemical resistance, and in particular, an excellent chemical resistance in TD is provided. The thermoplastic resin composition of the present invention is a thermoplastic resin composition produced by blending 40 to 90 parts by weight of a vinyl copolymer (A) prepared by copolymerization of a vinyl monomer mixture (a) comprising at least 5 to 40% by weight of an aromatic vinyl monomer (a1), 30 to 80% by weight of an unsaturated alkyl carboxylate ester monomer (a2), and 10 to 50% by weight of a cyanated vinyl monomer (a3) and 10 to 60 parts by weight of a graft (Continued)

copolymer (B) prepared by graft copolymerization of a vinyl monomer mixture (b) comprising at least 10 to 30% by weight of an aromatic vinyl monomer (b1), 30 to 80% by weight of an unsaturated alkyl carboxylate ester monomer (b2), and 1 to 10% by weight of a cyanated vinyl monomer (b3) in the presence of a rubbery polymer (r); wherein acetone-soluble content (C) of the thermoplastic resin composition has a number average molecular weight of 65,000 to 90,000.

8 Claims, 2 Drawing Sheets

(56) References Cited

FOREIGN PATENT DOCUMENTS

| JP | 2002128848 A | * | 5/2002 |
| JP | 2002-179873 A | | 6/2002 |
| JP | 2002-256043 A | | 9/2002 |
| JP | 2003-147146 A | | 5/2003 |
| JP | 3717217 B2 | | 11/2005 |
| JP | 2010-116427 A | | 5/2010 |
| JP | 2011-190388 A | | 9/2011 |
| JP | 2012-136644 A | | 7/2012 |

OTHER PUBLICATIONS

English translation of the Written Opinion of the International Searching Authority (Form PCT/ISA/237), dated Mar. 15, 2015, for Internatinoal Application No. PCT/JP2015/085108.
International Search Report, issued in PCT/JP2015/085108, PCT/ISA/210, dated Mar. 15, 2016.
Written Opinion of the International Searching Authority, issued in PCT/JP2015/085108, PCT/ISA/237, dated Mar. 15, 2016.
Yongqiang et al., "Materials for Making Writing Instrument", China Light Industry Press, Mar. 2007, 4 pages.

* cited by examiner

THERMOPLASTIC RESIN COMPOSITION, METHOD FOR PRODUCING SAME, AND MOLDED ARTICLE OF SAME

TECHNICAL FIELD

The present invention relates to a thermoplastic resin composition prepared by blending a vinyl copolymer and a graft copolymer, its production method, and a molded article thereof.

BACKGROUND ART

ABS resin prepared by graft copolymerization of a rubbery polymer such as diene rubber with an aromatic vinyl compound such as styrene and α-methylstyrene and a cyanated vinyl compound such as acrylonitrile and methacrylonitrile have excellent mechanical strength such as impact resistance and rigidity, moldability, cost performance, and the like, and accordingly, this resin is widely used in applications including home appliance, communications equipment, miscellaneous goods, and medical equipment. Of these applications, high transparency is required in exterior parts applications.

In the case of washing machine application as an example of home appliance, use of ultra-concentrated laundry detergents such as those known in the product names of "NANOX" (registered trademark) and Ultra Attack Neo are recently becoming common. These ultra-concentrated laundry detergents are more likely to deteriorate the resins compared to conventional laundry detergents, and the resin materials used for the washing machine application are required to have a chemical resistance to these chemical reagents. In the meanwhile, the resin materials used for medical equipment application are required to have chemical resistance to rubbing alcohol.

A resin composition is proposed as a resin composition having excellent transparency, chemical resistance, and color tone stability. This resin composition is a thermoplastic resin composition comprising a vinyl copolymer (A) having a graft copolymer (B) dispersed therein, wherein proportion of triplet sequence of the acrylonitrile monomer unit in the acetone-soluble content of the thermoplastic resin composition in relation to the acetone-soluble content is up to 10% by weight (see, for example, Patent Document 1). The transparent ABS resin disclosed in Patent Document 1, however, has been still insufficient for satisfying the recent demands for the high chemical resistance to chemical reagents such as organic solvents, detergents, and solvents such as rubbing alcohol, and the applications are limited.

One means for improving the chemical resistance of the ABS resin known in the art is increasing content of the cyanated vinyl compound. There has been proposed, for example, a thermoplastic resin composition comprising a vinyl copolymer prepared by polymerizing a vinyl monomer mixture containing 10 to 30% by weight of an aromatic vinyl monomer, 50 to 85% by weight of an unsaturated alkyl carboxylate ester monomer, 8 to 15% by weight of a cyanated vinyl monomer having dispersed therein a graft copolymer (B) prepared by graft polymerization of at least one vinyl monomer or vinyl monomer mixture in the presence of a rubbery polymer, and in this thermoplastic resin composition, proportion of triplet sequence of the acrylonitrile monomer unit in the acetone-soluble content of the thermoplastic resin composition in relation to the acetone-soluble content is at least 0.001% by weight and up to 10% by weight (see, for example, Patent Document 2). Also proposed is a transparent thermoplastic resin composition prepared by blending a vinyl copolymer prepared by polymerizing a vinyl monomer mixture containing 10 to 30% by weight of an aromatic vinyl monomer, 30 to 80% by weight of an unsaturated alkyl carboxylate ester monomer, and 1 to 10% by weight of cyanated vinyl monomer, and a graft copolymer prepared by graft polymerization of at least one vinyl monomer in the presence of a rubbery polymer, and this resin composition has a reduced viscosity in methyl ethyl ketone of the acetone-soluble content of the resin composition of 0.70 to 0.75 dl/g (see, for example, Patent Document 3).

As a means for improving impact resistance and flowability of the ABS resin, there has been disclosed, for example, a rubber reinforced thermoplastic resin composition containing a copolymer prepared by copolymerizing a monomer mixture at least containing an aromatic vinyl monomer and a cyanated vinyl monomer, and a graft copolymer prepared by graft polymerization of a monomer mixture at least containing an aromatic vinyl monomer and a cyanated vinyl monomer in the presence of a rubbery polymer, wherein proportion of the components having a molecular weight of less than 50,000 in the acetone-soluble content in relation to the total weight of the acetone-soluble content is less than 30% by weight, and proportion of the components having a molecular weight of at least 250,000 in relation to the total weight of the acetone-soluble content is 5 to 15% by weight, and molecular weight distribution (Mw/Mn) represented by the ratio of the weight average molecular weight (Mw) to the number average molecular weight (Mn) of the acetone-soluble content is in the range of 1.5 to 2.5 (see, for example, Patent Document 4).

PRIOR ART DOCUMENTS

Patent Documents

Patent Document 1: Japanese Unexamined Patent Publication (Kokai) No. 2002-179873
Patent Document 2: Japanese Unexamined Patent Publication (Kokai) No. 2010-116427
Patent Document 3: Japanese Unexamined Patent Publication (Kokai) No. 2011-190388
Patent Document 4: Japanese Unexamined Patent Publication (Kokai) No. 2012-136644

SUMMARY OF THE INVENTION

Problems to be Solved by the Invention

However, chemical resistance to the ultra-concentrated laundry detergent and the rubbing alcohol was still insufficient even by the use of technologies disclosed in Patent Documents 2 to 4. The chemical resistance of the molded article is generally inferior in transverse direction (TD: direction perpendicular to the direction of flow) compared to the chemical resistance in the machine direction (MD: direction of the flow), and in particular, the chemical resistance of the molded article in TD was still insufficient even by the use of these technologies.

In view of the situation as described above, an object of the present invention is to provide a thermoplastic resin composition which has excellent moldability and which can produce a molded article having excellent chemical resistance, and in particular, excellent chemical resistance in TD.

Means for Solving the Problems

The inventors of the present invention conducted an intensive study to obviate the problems as described above, and found that the problems can be solved by the constitution as described below.

(1) A thermoplastic resin composition which is a thermoplastic resin composition produced by blending 40 to 90 parts by weight of a vinyl copolymer (A) prepared by copolymerization of a vinyl monomer mixture (a) comprising at least 5 to 40% by weight of an aromatic vinyl monomer (a1), 30 to 80% by weight of an unsaturated alkyl carboxylate ester monomer (a2), and 10 to 50% by weight of a cyanated vinyl monomer (a3) and 10 to 60 parts by weight of a graft copolymer (B) prepared by graft copolymerization of a vinyl monomer mixture (b) comprising at least 10 to 30% by weight of an aromatic vinyl monomer (b1), 30 to 80% by weight of an unsaturated alkyl carboxylate ester monomer (b2), and 1 to 10% by weight of a cyanated vinyl monomer (b3) in the presence of a rubbery polymer (r); wherein acetone-soluble content (C) of the thermoplastic resin composition has a number average molecular weight of 65,000 to 90,000.

(2) A thermoplastic resin composition according to (1) wherein the acetone-soluble content (C) of the thermoplastic resin composition has an acrylonitrile content of 8 to 50% by weight, and acetone-insoluble content (D) of the thermoplastic resin composition has an acrylonitrile content of 1 to 5% by weight.

(3) A thermoplastic resin composition according to (1) or (2) wherein the acetone-soluble content (C) of the thermoplastic resin composition has a dispersity of 2.0 to 2.5, and the acetone-soluble content (C) of the thermoplastic resin composition has a content of the component having a molecular weight of at least 250,000 of 15 to 30% by weight and content of the component having a molecular weight of less than 50,000 of less than 30% by weight.

(4) A thermoplastic resin composition according to any one of (1) to (3) wherein the vinyl copolymer (A) has a number average molecular weight of 80,000 to 100,000.

(5) A thermoplastic resin composition according to any one of (1) to (4) wherein the vinyl copolymer (A) has a dispersity of up to 2.0.

(6) A thermoplastic resin composition according to any one of (1) to (5) wherein the acetone-soluble content of the graft copolymer (B) has a number average molecular weight of 30,000 to 50,000.

(7) A thermoplastic resin composition according to any one of (1) to (6) wherein the acetone-soluble content of the graft copolymer (B) has a dispersity of 2.0 to 2.5.

(8) A method for producing a thermoplastic resin composition having an acetone-soluble content (C) of the thermoplastic resin composition of a number average molecular weight of 65,000 to 90,000 comprising the steps of: conducting copolymerization of a vinyl monomer mixture (a) comprising 5 to 40% by weight of an aromatic vinyl monomer (a1), 30 to 80% by weight of an unsaturated alkyl carboxylate ester monomer (a2), and 10 to 50% by weight of a cyanated vinyl monomer (a3) to produce a vinyl copolymer (A); conducting graft copolymerization of a vinyl monomer mixture (b) comprising at least 10 to 30% by weight of an aromatic vinyl monomer (b1), 30 to 80% by weight of an unsaturated alkyl carboxylate ester monomer (b2), and 1 to 10% by weight of a cyanated vinyl monomer (b3) in the presence of a rubbery polymer (r) to produce a graft copolymer (B); and blending at least 40 to 90 parts by weight of the vinyl copolymer (A) and 10 to 60 parts by weight of the graft copolymer (B).

(9) A molded article comprising the thermoplastic resin composition according to any one of (1) to (7).

Advantageous Effect of the Invention

The thermoplastic resin composition of the present invention has excellent moldability. The thermoplastic resin composition of the present invention enables production of a molded article having an excellent chemical resistance, and in particular, the chemical resistance in TD.

DESCRIPTION OF PREFERRED EMBODIMENTS

Figure 1:
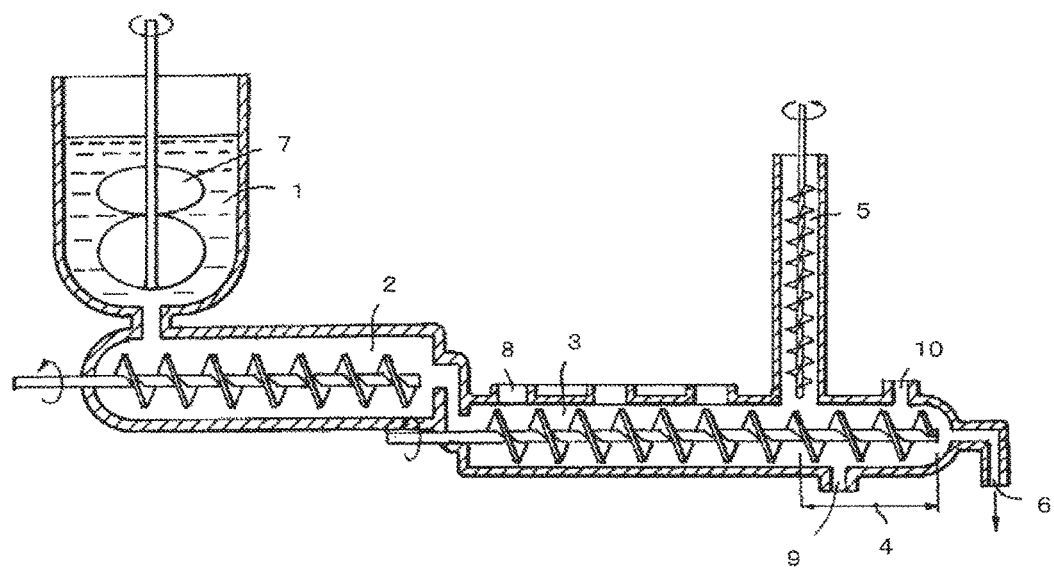
FIG. 1 is a schematic view showing an embodiment of the production apparatus adapted for use in the method for producing the thermoplastic resin composition of the present invention.

The thermoplastic resin composition of the present invention comprises a vinyl copolymer (A) as described below and the graft copolymer (B) as described below blended therewith. Since it has the vinyl copolymer (A) blended therewith, the thermoplastic resin composition enjoys improved moldability and the resulting molded article enjoys improved chemical resistance, and in particular, improved chemical resistance in TD. The thermoplastic resin composition of the present invention also has a graft copolymer (B) blended therewith, and therefore, it enjoys improved moldability and the resulting molded article enjoys improved impact resistance. It is to be noted that, in the present invention, chemical resistance of the test piece prepared by cutting out the molded article in MD is designated the "chemical resistance in MD", and chemical resistance of the test piece prepared by cutting out the molded article in TD is designated the "chemical resistance in TD".

The thermoplastic resin composition of the present invention is the one prepared by blending 40 to 90 parts by weight of vinyl copolymer (A) and 10 to 60 parts by weight of graft copolymer (B), and it has a characteristic feature that the acetone-soluble content (C) has a number average molecular weight of 65,000 to 90,000. The vinyl copolymer (A) is a copolymer of a vinyl monomer mixture (a), and the vinyl monomer mixture (a) at least contains an aromatic vinyl monomer (a1), an unsaturated alkyl carboxylate ester monomer (a2), and a cyanated vinyl monomer (a3). The graft copolymer (B) is a graft copolymer of a vinyl monomer mixture (b) to a rubbery polymer (r), and this vinyl monomer mixture (b) at least contains an aromatic vinyl monomer (b1), an unsaturated alkyl carboxylate ester monomer (b2), and a cyanated vinyl monomer (b3).

The vinyl copolymer (A) constituting the thermoplastic resin composition of the present invention is a vinyl copolymer prepared by copolymerizing a vinyl monomer mixture (a) at least containing 5 to 40% by weight of an aromatic vinyl monomer (a1), 30 to 80% by weight of an unsaturated alkyl carboxylate ester monomer (a2), and 10 to 50% by weight of a cyanated vinyl monomer (a3). The vinyl monomer mixture (a) may additionally contain a monomer which is copolymerizable with the (a1) to (a3) as described above.

Examples of the aromatic vinyl monomer (a1) include styrene, α-methylstyrene, p-methylstyrene, m-methylstyrene, o-methylstyrene, vinyl toluene, and t-butylstyrene, which may be used in combination of two or more. Of these, the preferred is styrene in view of improving moldability of the thermoplastic resin composition and rigidity of the molded article.

Content of the aromatic vinyl monomer (a1) in the vinyl monomer mixture (a) is at least 5% by weight, preferably at least 10% by weight, and more preferably at least 20% by weight in the total (100% by weight) of the vinyl monomer mixture (a) in view of improving the moldability of the thermoplastic resin composition and the rigidity of the molded article. In the meanwhile, content of the aromatic vinyl monomer (a1) in the vinyl monomer mixture (a) is up to 40% by weight, preferably up to 30% by weight, and more preferably up to 25% by weight in view of improving the impact resistance and the transparency of the molded article.

The unsaturated alkyl carboxylate ester monomer (a2) is not particularly limited, and the preferred are esters of an alcohol and acrylic acid or methacrylic acid containing 1 to 6 carbon atoms. The ester of an alcohol and acrylic acid or methacrylic acid containing 1 to 6 carbon atoms may also have a substituent such as hydroxy group or a halogen group. Exemplary esters of an alcohol and acrylic acid or methacrylic acid containing 1 to 6 carbon atoms include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate, which may be used alone or in combination of two or more. Of these, the preferred is methyl (meth)acrylate in view of improving the transparency of the molded article. It is to be noted that "(meth)acrylic acid" designates "acrylic acid or methacrylic acid".

Content of the unsaturated alkyl carboxylate ester monomer (a2) in the vinyl monomer mixture (a) is at least 30% by weight, preferably at least 50% by weight, and more preferably at least 60% by weight in the total (100% by weight) of the vinyl monomer mixture (a) in view of improving the transparency of the molded article. In the meanwhile, content of the unsaturated alkyl carboxylate ester monomer (a2) in the vinyl monomer mixture (a) is up to 80% by weight, preferably up to 75% by weight, and more preferably up to 70% by weight in view of improving the chemical resistance and the transparency of the molded article.

Examples of the cyanated vinyl monomer (a3) include acrylonitrile, methacrylonitrile, and ethacrylonitrile which may be used alone or in combination of two or more. Of these, the preferred is acrylonitrile in view of improving the chemical resistance and the impact resistance of the molded article.

Content of the cyanated vinyl monomer (a3) in the vinyl monomer mixture (a) is at least 10% by weight, and preferably at least 15% by weight in the total (100% by weight) of the vinyl monomer mixture (a) in view of improving the chemical resistance and impact resistance of the molded article. In the meanwhile, content of the cyanated vinyl monomer (a3) in the vinyl monomer mixture (a) is up to 50% by weight, preferably up to 40% by weight, and more preferably up to 20% by weight in view of improving the color tone of the molded article.

The additional monomer which is copolymerizable with these monomers is not particularly limited as long as it is a vinyl monomer other than the aromatic vinyl monomer (a1), the unsaturated alkyl carboxylate ester monomer (a2), and the cyanated vinyl monomer (a3) as described above and it does not adversely affect the merits of the present invention. Examples include unsaturated fatty acids, acrylamide monomers, and maleimide monomers which may be used alone or in combination of two or more. Exemplary unsaturated fatty acids include itaconic acid, maleic acid, fumaric acid, butenoic acid, acrylic acid, and methacrylic acid. Exemplary acrylamide monomers include acrylamide, methacrylamide, and N-methyl acrylamide. Exemplary maleimide monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, and N-phenylmaleimide.

In the present invention, solubility parameter of the vinyl copolymer (A) is preferably 20.4 to 25.6 $(J/cm^3)^{1/2}$. When the solubility parameter of the vinyl copolymer (A) is at least 20.4 $(J/cm^3)^{1/2}$, the molded article will have improved chemical resistance. In the meanwhile, when the solubility parameter of the vinyl copolymer (A) is up to 25.6 $(J/cm^3)^{1/2}$, compatibility with the graft component of the graft copolymer (B) as described below will be improved. The solubility parameter is more preferably up to 25.2 $(J/cm^3)^{1/2}$. One definition of the "solubility parameter" as used herein may be represented by the following equation (1):

$$\delta = (\Sigma \Delta Ei \times X / \Sigma \Delta Vm \times X)^{1/2} \quad (1)$$

δ: solubility parameter of the vinyl copolymer (A) $(J/cm^3)^{1/2})$

X: molar fraction (%) of the copolymer component constituting the vinyl copolymer (A)

ΔEi: evaporation energy (J/mol) of the copolymer component constituting the vinyl copolymer (A)

ΔVm: molecular volume $(cm^3/mol)$ of the copolymer component constituting the vinyl copolymer (A)

H. Burrell, Offic. Dig., A. J. Tortorello, M. A. Kinsella, J. Coat. Technol. may be referred for the equation (1) and the values of X, ΔEi, and ΔVm.

The solubility parameter of the vinyl copolymer (A) may be adjusted to the desired range by selecting the composition of the vinyl monomer mixture (a).

In the present invention, number average molecular weight of the vinyl copolymer (A) is preferably at least 80,000 and more preferably at least 85,000. When the number average molecular weight of the vinyl copolymer (A) is at least 80,000, the molded article will have improved chemical resistance, and in particular, improved chemical resistance in TD. In the meanwhile, the number average molecular weight of the vinyl copolymer (A) is preferably up to 100,000 and more preferably up to 96,000. When the number average molecular weight of the vinyl copolymer (A) is up to 100,000, the thermoplastic resin composition will have improved moldability.

When the vinyl copolymer (A) has the number average molecular weight in such range, adjustment of the number average molecular weight of the acetone-soluble content (C) of the thermoplastic resin composition as described below to the range of 65,000 to 90,000 will be facilitated.

The vinyl copolymer (A) having the number average molecular weight in the range of 80,000 to 100,000 can be easily prepared, for example, by using the initiator or the chain transfer agent as described below or by adjusting the polymerization temperature to the preferable range as describe below.

In the present invention, dispersity of the vinyl copolymer (A) is preferably up to 2.0. When the vinyl copolymer (A) has a dispersity of up to 2.0, the thermoplastic resin composition will have improved moldability and the molded article will have improved chemical resistance, and in particular, improved chemical resistance in TD.

The dispersity of the vinyl copolymer (A) can be easily adjusted to the range of up to 2.0, for example, by producing the vinyl copolymer (A) by continuous bulk polymerization or continuous solution polymerization as described below.

The number average molecular weight and the dispersity of the vinyl copolymer (A) can be calculated from the GPC chromatogram obtained by using a solution (about 0.2% by weight) of about 0.03 g of the vinyl copolymer (A) in about 15 g of tetrahydrofuran and using polymethyl methacrylate for the standard. The GPC may be measured under the following conditions.

Measurement apparatus: Waters 2695
Column temperature: 40° C.
Detector: RI2414 (differential refractive index detector)
Flow rate of carrier eluent: 0.3 ml/minute (solvent, tetrahydrofuran)
Column: TSKgel Super HZM-M (6.0 mm I.D.×15 am), TSKgel Super HZM-N (6.0 mm I.D×15 cm), serial (both are products of TOSOH CORPORATION)

In the present invention, difference between refractive index of the vinyl copolymer (A) and refractive index of the rubbery polymer (r) as described below is preferably up to 0.03 and more preferably up to 0.01. When the difference between the refractive index of the vinyl copolymer (A) and the refractive index of the rubbery polymer (r) is adjusted to the range of up to 0.03, the molded article will have improved transparency.

Refractive index of the vinyl copolymer (A) depends mainly on the composition of the vinyl monomers used for the starting material, and accordingly, the refractive index can be adjusted to the desired range by adequately selecting the type of the vinyl monomers and their compositional ratio. It is to be noted that the refractive index of the vinyl copolymer (A) can be estimated from the refractive index and the content of the vinyl monomers, and for example, in the case of a copolymer of styrene, acrylonitrile, and methyl methacrylate, the refractive index of the vinyl copolymer (A) can be estimated by the following equation:

$$nD(A)=(1.510\times MA/100)+(1.595\times MS/100)+(1.490\times MM/100)$$

wherein nD(A) is the refractive index of the vinyl copolymer (A), MA is the acrylonitrile content (% by weight), MS is the styrene content (% by weight), and MM is the methyl methacrylate content (o by weight) while 1.510 is the refractive index of the acrylonitrile, 1.595 is the refractive index of the styrene, and 1.490 is the refractive index of the methyl methacrylate which can be calculated respectively by measuring the refractive index of the polyacrylonitrile, the polystyrene, and the polymethyl methacrylate with Abbe refractometer.

The refractive index of the vinyl copolymer (A) can be measured by using a film having a thickness of 30±5 μm obtained by pressing the vinyl copolymer (A) with a hot press at 230° C. for the measurement sample by dropping a small amount of 1-bromonaphthalene, and conducing the measurement under the conditions including use of D line from a sodium lamp as the light source at a measurement temperature of 23° C. using Abbe refractometer.

In the present invention, the method used for producing the vinyl copolymer (A) is not particularly limited. However, the preferred are the continuous bulk polymerization and the continuous solution polymerization in view of the moldability of the resulting thermoplastic resin composition and the chemical resistance, the transparency, and the color tone stability of the molded article, and also, in view of the ease of adjusting the dispersity of the vinyl copolymer (A).

Any method may be used for the production of the vinyl copolymer (A) by the continuous bulk polymerization or the continuous solution polymerization. An exemplary method is polymerization of the vinyl monomer mixture (a) in the polymerization tank followed by monomer removal (desolvation, devolatilization).

Exemplary polymerization tanks include mixing polymerization tanks having agitation impellers such as paddle impellers, turbine impellers, propeller impellers, Brumargin impellers, multi-stage impellers, anchor impellers, maxblend impellers, or double-helical impellers as well as various tower reactors. A multi-tube reactor, kneader reactors, or twin screw extruder may also be used for the polymerization reactor (see, for example, "Assessment of impact-resistant polystyrene (Assessment of polymer production process 10)" published by The Society of Polymer Science, Japan on Jan. 26, 1989).

The polymerization tank or polymerization reactor may be used in combination of two or more tanks (reactors), or if desired, two or more types of polymerization tanks or polymerization reactors may be used in combination. In view of reducing the dispersity of the vinyl copolymer (A), number of the tank or the reactor is preferably up to 2, and use of a single-tank complete mixing polymerization tank is more preferable.

Typically, the reaction mixture obtained as a polymerization product in the polymerization tank or polymerization reactor is subsequently subjected to the step of monomer removal where the monomers, solvent, and other volatile components are removed. Exemplary method used for the monomer removal include a method wherein a single or twin screw extruder having a vent is heated under normal or reduced pressure to remove the volatile content from the vent hole, a method wherein the volatile components are removed in an evaporator having a plate fin-type heater such as centrifuge-type heater in the drum, a method wherein the volatile components are removed by a thin film evaporator such as centrifuge-type thin film evaporator, and a method wherein the volatile components are removed by preheating, foaming, and flashing into vacuum tank by using a multitubular heat exchanger. Of these, the preferred is use of the method wherein the volatile components are removed by a single or twin screw extruder having a vent.

The production of the vinyl copolymer (A) may be conducted with optional use of an initiator. Exemplary initiators include peroxides, azo compounds, and water-soluble potassium persulfate, which may be used in combination of two or more.

Examples of the peroxide include benzoyl peroxide, cumene hydroperoxide, dicumyl peroxide, diisopropylbenzene hydroperoxide, t-butyl hydroperoxide, t-butylperoxy acetate, t-butylperoxy benzoate, t-butyl isopropylcarbonate, di-t-butyl peroxide, t-butyl peroctate, 1,1-bis(t-butylperoxy) 3,3,5-trimethylcyclohexane, 1,1-bis(t-butylperoxy)cyclohexane, and t-butylperoxy-2-ethyl hexanoate, and the most preferred is use of cumene hydroperoxide, 1,1-bis(t-butylperoxy)3,3,5-trimethylcyclohexane, and 1,1-bis(t-butylperoxy)cyclohexane.

Examples of the azo compound include azobisisobutyronitrile, azobis(2,4-dimethylvaleronitrile), 2-phenylazo-2, 4-dimethyl-4-methoxyvaleronitrile, 2-cyano-2-propylazoformamide, 1,1'-azobiscyclohexane-1-carbonitrile, azobis (4-methoxy-2,4-dimethylvaleronitrile), dimethyl-2,2'-azobisisobutylate, 1-t-butylazo-2-cyanobutane, and 2-t-butylazo-2-cyano-4-methoxy-4-methylpentane, and of these, the most preferred is use of 1,1'-azobis cyclohexane-1-carbonitrile.

Amount of the initiator added for the production of the vinyl copolymer (A) is not particularly limited. The amount added, however, is preferably 0.01 to 0.03 parts by weight in relation to the total (100 parts by weight) of the vinyl monomer mixture (a) in view of the ease of adjusting the number average molecular weight and the dispersity of the vinyl copolymer (A) to the ranges as described above.

The production of the vinyl copolymer (A) may be conducted by using a chain transfer agent. Use of the chain transfer agent facilitates adjustment of the number average molecular weight of the vinyl copolymer (A) to the desired range. Exemplary chain transfer agents include mercaptans such as n-octyl mercaptan, t-dodecyl mercaptan, n-dodecyl mercaptan, n-tetradecyl mercaptan, and n-octadecyl mercaptan and terpenes such as terpinolene, which may be used in combination of two or more. Of these, the preferred is use of n-octyl mercaptan and t-dodecyl mercaptan.

Amount of the chain transfer agent added for the production of the vinyl copolymer (A) is not particularly limited. The amount added, however, is preferably 0.10 to 0.15 parts by weight in relation to the total (100 parts by weight) of the vinyl monomer mixture (a) in view of the ease of adjusting the number average molecular weight and the dispersity of the vinyl copolymer (A) to the ranges as described above.

When the vinyl copolymer (A) is produced by continuous bulk polymerization or continuous solution polymerization, the polymerization temperature used is not particularly limited. The polymerization temperature, however, is preferably in the range of 120 to 140° C. in view of ease of adjusting the number average molecular weight and the dispersity of the vinyl copolymer (A) to the ranges as described above.

When the vinyl copolymer (A) is produced by continuous solution polymerization, amount of the solvent is preferably up to 30% by weight and more preferably up to 20% by weight in view of the productivity. The solvent used is preferably ethylbenzene or methyl ethyl ketone considering the polymerization stability. The most preferred is use of the ethylbenzene.

The graft copolymer (B) constituting the thermoplastic resin composition of the present invention is the one obtained by graft copolymerization of a vinyl monomer mixture (b) comprising at least 10 to 30% by weight of an aromatic vinyl monomer (b1), 30 to 80% by weight of an unsaturated alkyl carboxylate ester monomer (b2), and 1 to 10% by weight of a cyanated vinyl monomer (b3) in the presence of a rubbery polymer (r). If desired, the vinyl monomer mixture (b) may further contain an additional monomer which is copolymerizable with the (b1) to (b3) as described above.

Examples of the rubbery polymer (r) include polybutadiene, poly(butadiene-styrene) (SBR), poly(butadiene-acrylonitrile) (NBR), polyisoprene, poly(butadiene-butyl acrylate), poly(butadiene-methyl methacrylate), poly(butyl acrylate-methyl methacrylate), poly(butadiene-ethyl acrylate), ethylene-propylene rubber, poly(ethylene-isoprene), poly(ethylene-methyl acrylate), and natural rubber, which may be used in combination of two or more. Of these, the preferred are polybutadiene, SBR, NBR, ethylene-propylene rubber, and natural rubber in view of improving the impact resistance.

Content of the rubbery polymer (r) is preferably 20 to 80% by weight in relation to the total of the rubbery polymer (r) and the vinyl monomer mixture (b) as described below constituting the graft copolymer (B). When the content of the rubbery polymer (r) is at least 20% by weight, the resulting molded article will have improved impact resistance. The content of the rubbery polymer (r) is more preferably at least 35% by weight. In the meanwhile, when the content of the rubbery polymer (r) is up to 80% by weight, the thermoplastic resin composition will have improved moldability. The content of the rubbery polymer (r) is more preferably up to 60% by weight.

The rubbery polymer (r) is not particularly limited for its weight average particle diameter. The weight average particle diameter, however, is preferably at least 0.1 μm and more preferably at least 0.15 μm in view of improving the impact resistance of the molded article. In the meanwhile, the weight average particle diameter is preferably up to 1.5 μm and more preferably up to 0.5 μm in view of improving the transparency of the molded article.

Examples of the aromatic vinyl monomer (b1) include those mentioned for the aromatic vinyl monomer (a1), and the preferred is styrene.

Content of the aromatic vinyl monomer (b1) in the vinyl monomer mixture (b) is at least 10% by weight, preferably at least 15% by weight, and more preferably at least 20% by weight in the total (100% by weight) of the vinyl monomer mixture (b) in view of improving the moldability of the thermoplastic resin composition and the rigidity of the molded article. In the meanwhile, content of the aromatic vinyl monomer (b1) in the vinyl monomer mixture (b) is up to 30% by weight and preferably up to 25% by weight in view of improving the impact resistance and the transparency of the molded article.

Examples of the unsaturated alkyl carboxylate ester monomer (b2) include those mentioned for the unsaturated alkyl carboxylate ester monomer (a2), and the preferred is methyl (meth)acrylate.

Content of the unsaturated alkyl carboxylate ester monomer (2) in the vinyl monomer mixture (b) is at least 30% by weight, preferably at least 50% by weight, and more preferably at least 70% by weight in the total (100% by weight) of the vinyl monomer mixture (b) in view of improving the transparency of the molded article. In the meanwhile, content of the unsaturated alkyl carboxylate ester monomer (b2) in the vinyl monomer mixture (b) is up to 80% by weight and preferably up to 75% by weight in view of improving the chemical resistance and the transparency of the molded article.

Examples of the cyanated vinyl monomer (b3) include those mentioned for the cyanated vinyl monomer (a3), and the preferred is acrylonitrile.

Content of the cyanated vinyl monomer (b3) in the vinyl monomer mixture (b) is at least 1% by weight and preferably at least 2% by weight in view of improving the chemical resistance and impact resistance of the molded article. In the meanwhile, content of the cyanated vinyl monomer (b3) in the vinyl monomer mixture (b) is up to 10% by weight, more preferably up to 8% by weight, and more preferably up to 5% by weight in view of improving the color tone of the molded article.

The additional monomer which is copolymerizable with these monomers is not particularly limited as long as it is a vinyl monomer other than the aromatic vinyl monomer (b1), the unsaturated alkyl carboxylate ester monomer (b2), and the cyanated vinyl monomer (b3) as described above and it does not adversely affect the merits of the present invention.

Examples include those mentioned as additional monomers for the vinyl monomer mixture (a).

In the present invention, number average molecular weight of the acetone-soluble content of the graft copolymer (B) is preferably at least 30,000. When the number average molecular weight of the acetone-soluble content of the graft copolymer (B) is at least 30,000, the molded article will have improved chemical resistance, and in particular, improved chemical resistance in TD. In the meanwhile, the number average molecular weight of the acetone-soluble content of the graft copolymer (B) is preferably up to 50,000 and more preferably up to 40,000. When the acetone-soluble content of the graft copolymer (B) is up to 50,000, the thermoplastic resin composition will have improved moldability.

When the acetone-soluble content of the graft copolymer (B) has the number average molecular weight in such range, adjustment of the number average molecular weight of the acetone-soluble content (C) of the thermoplastic resin composition as described below to the range of 65,000 to 90,000 will be facilitated.

The graft copolymer (B) having the number average molecular weight of the acetone-soluble content of 30,000 to 50,000 can be readily prepared by using an initiator or a chain transfer agent as described below or by adjusting the polymerization temperature to the preferable range as described below.

In the present invention, the acetone-soluble content of the graft copolymer (B) may preferably have a dispersity of 2.0 to 2.5. When the acetone-soluble content of the graft copolymer (B) has a dispersity of at least 2.0, production of the graft copolymer (B) will be facilitated. In the meanwhile, when the acetone-soluble content of the graft copolymer (B) has a dispersity of up to 2.5, the molded article will have improved chemical resistance, and in particular, improved chemical resistance in TD.

The graft copolymer (B) wherein the acetone-soluble content has a dispersity of 2.0 to 2.5 can be produced, for example, by emulsion polymerization, suspension polymerization, continuous bulk polymerization, or solution continuous polymerization as described below.

The number average molecular weight and the dispersity of the acetone-soluble content of the graft copolymer (B) may be measured by a procedure similar to the vinyl copolymer (A) by separating the acetone-insoluble content from the graft copolymer (B) and concentrating the filtrate by using a rotary evaporator, and measuring the acetone-soluble content.

In the present invention, content of the acetone-soluble content in the graft copolymer (B) is not particularly limited. The content, however, is preferably at least 10% by weight, more preferably at least 15% by weight, and still more preferably at least 20% by weight in view of improving the flowability of the molded article. In the meanwhile, the content of the acetone-soluble content in the graft copolymer (B) is preferably up to 40% by weight, more preferably up to 35% by weight, and still more preferably up to 30% by weight in view of improving the chemical resistance of the molded article.

The graft copolymer (B) is not particularly limited for its graft ratio. However, the graft ratio is preferably in the range of 10 to 100% in view of improving impact resistance of the molded article.

The graft ratio of the graft copolymer (B) may be determined by the procedure as described below. First, 80 ml of acetone is added to about 1 g of the graft copolymer (B) (m: mass of the sample), and the mixture is refluxed in a hot water bath at 70° C. for 3 hours, and subjected to centrifugation at 8000 r.p.m (10000 G) for 40 minutes. The acetone-insoluble content was separated by filtration. After drying the resulting acetone-insoluble content at a reduced pressure at 80° C. for 5 hours, the mass (n) is measured, and the graft ratio is calculated by the following equation wherein X is content (%) of the rubbery polymer (r) in the graft copolymer (B).

$$\text{Graft ratio }(\%)=\{[(n)-((m)\times X/100)]/[(m)\times X/100]\}\times 100$$

In the present invention, difference between refractive index of the graft component (the acetone-insoluble content) of the graft copolymer (B) and refractive index of the rubbery polymer (r) is preferably up to 0.03 and more preferably up to 0.01. When the difference between the refractive index of the graft copolymer (B) and the refractive index of the rubbery polymer (r) is up to 0.03, the molded article will have improved transparency.

The refractive index of the graft component of the graft copolymer (B) depends mainly on the composition of the vinyl monomers used for the starting material, and accordingly, the refractive index can be adjusted to the desired range by adequately selecting the type of the vinyl monomers and their compositional ratio. In particular, when polymer conversion of at least 95% is attained by emulsion polymerization, the composition of the graft components will be substantially the same as the composition of the vinyl monomer mixture (b). It is to be noted that the refractive index of the graft component of the graft copolymer (B) can be estimated from the refractive index and the content of the vinyl monomers, and for example, in the case of a copolymer of styrene, acrylonitrile, and methyl methacrylate, the refractive index of the graft copolymer (B) can be estimated by the following equation:

$$nD(G)=(1.510\times MA/100)+(1.595\times MS/100)+(1.490\times MM/100)$$

wherein nD(G) is the refractive index of the graft component of the graft copolymer (B), MA is the acrylonitrile content (% by weight), MS is the styrene content (% by weight), and MM is the methyl methacrylate content (% by weight) while 1.510 is the refractive index of the acrylonitrile, 1.595 is the refractive index of the styrene, and 1.490 is the refractive index of the methyl methacrylate which can be calculated respectively by measuring the refractive index of the polyacrylonitrile, the polystyrene, and the polymethyl methacrylate with Abbe refractometer.

The refractive index of the rubbery polymer (r) is generally described in a document, and for example, the refractive index of polybutadiene rubber is 1.516. When a copolymer rubber is used, the refractive index of the copolymer rubber may be estimated from the refractive index and the content of the copolymer components. For example, in the case of styrene butadiene rubber, the refractive index (nD(r)) of the copolymer rubber may be estimated by the following equation. It is to be noted that the copolymer component can be identified by FT-IR, viscoelasticity measurement, and the like.

$$nD(r)=(1.516\times MB/100)+(1.595\times MS/100)$$

wherein nD(r) is the refractive index of the rubbery polymer (r), MB is the butadiene content (% by weight), MS is styrene content (% by weight), 1.516 is the refractive index of butadiene, and 1.595 is the refractive index of styrene.

The refractive index of the graft component of the graft copolymer (B) can be actually measured by dissolving the graft copolymer (B) in acetone and separating the acetone-soluble content by filtration to obtain the filtration residue, and thereafter conducting the measurement of the dried residue (the grafted components) as in the case of the vinyl copolymer (A).

In the present invention, the method used for producing the graft copolymer (B) is not particularly limited, and any method such as emulsion polymerization, suspension polymerization, continuous bulk polymerization, or solution continuous polymerization may be used. The preferred are emulsion polymerization and bulk polymerization, and the more preferred is use of the emulsion polymerization in view of the ease of adjusting the particle size of the rubbery polymer (r) to the desired range and ease of realizing the polymerization stability by heat removal during the polymerization.

When the graft copolymer (B) is produced by emulsion polymerization, the way how the rubbery polymer (r) and the vinyl monomer mixture (b) are introduced is not particularly limited. For example, these components may be introduced at initial stage at once, or alternatively, some of the vinyl monomer mixture (b) may be continuously introduced or all or some of the vinyl monomer mixture (b) may be incrementally introduced for the purpose of adjusting the distribution of the copolymer composition. "The continuous introduction of some of the vinyl monomer mixture (b)" as used herein means that some of the vinyl monomer mixture (b) is initially introduced, and the remainder is thereafter continuously introduced. "The incremental introduction of some or all of the vinyl monomer mixture (b)" means that some or all of the vinyl monomer mixture (b) is introduced at some point after the initial introduction.

When the graft copolymer (B) is produced by emulsion polymerization, various surfactant may be added as an emulsifier. As the surfactant, the most preferred is use of an anionic surfactant such as carboxylate salt surfactant, sulfate ester surfactant, or sulfonate salt surfactant, which may be used in combination of two or more. The "salt" as used herein includes alkali metal salts such as sodium salt, lithium salt, and potassium salt as well as ammonium salt.

Examples of the carboxylate salt emulsifiers include caprylate salt, caprate salt, laurylate salt, myristate salt, palmitate salt, stearate salt, oleate salt, linoleate salt, linolenate salt, rosinate salt, behenate salt, and dialkylsulfosccinate salt.

Examples of the sulfate ester salt emulsifier include sulfate ester salt of castor oil, sulfate ester salt of lauryl alcohol, polyoxyethylene lauryl sulfate salt, polyoxyethylene alkyl ether sulfate salt, and polyoxyethylene alkyl phenyl ether sulfate salt.

Examples of the sulfonate salt emulsifier include dodecyl benzene sulfonate salt, alkyl naphthalene sulfonate salt, alkyl diphenyl ether disulfonate salt, and naphthalene sulfonate salt condensate.

When the graft copolymer (B) is produced by emulsion polymerization, an initiator or a chain transfer agent may be optionally added. Examples of the initiator and the chain transfer agent include the initiators and the chain transfer agents mentioned for the production method of the vinyl copolymer (A). The initiator may be used in redox system.

Amount of the initiator added for the production of the graft copolymer (B) is not particularly limited. The amount added, however, is preferably 0.1 to 0.5 parts by weight in relation to the total (100 parts by weight) of the rubbery polymer (r) and the vinyl monomer mixture (b) in view of the ease of adjusting the number average molecular weight and the dispersity of the graft copolymer (B) to the ranges as described above.

Amount of the chain transfer agent added for the production of the graft copolymer (B) is not particularly limited. The amount added, however, is preferably 0.2 to 0.7 parts by weight in relation to the total (100 parts by weight) of the rubbery polymer (r) and the vinyl monomer mixture (b) in view of the ease of adjusting the number average molecular weight, the dispersity, and the graft ratio of the graft copolymer (B) to the ranges as described above. The amount added is more preferably at least 0.4 parts by weight and still more preferably up to 0.6 parts by weight.

The polymerization temperature used in the production of the graft copolymer (B) by emulsion polymerization is not particularly limited. The polymerization temperature, however, is preferably in the range of 40 to 70° C. in view of the ease of adjusting the number average molecular weight and the dispersity of the graft copolymer (B) to the ranges as described above and also in view of the emulsion stability.

When the graft copolymer (B) is produced by emulsion polymerization, a coagulant is typically added to a graft copolymer latex for the recovery of the graft copolymer (B). Preferable coagulants include an acid or a water-soluble salt.

Exemplary acids include sulfuric acid, hydrochloric acid, phosphoric acid, and acetic acid, and exemplary water-soluble salts include calcium chloride, magnesium chloride, barium chloride, aluminum chloride, magnesium sulfate, aluminum sulfate, aluminum ammonium sulfate, aluminum potassium sulfate, and aluminum sodium sulfate, which may be used in combination of two or more. In view of improving the color tone of the molded article, it is preferable that the emulsifier is not left in the thermoplastic resin composition, and use of an alkaline fatty acid salt for the emulsifier and coagulation by an acid is preferable. In this case, it is preferable that the emulsifier is subsequently removed by neutralizing with an alkali such as sodium hydroxide.

The thermoplastic resin composition of the present invention is prepared by blending 40 to 90 parts by weight of the vinyl copolymer (A) and 10 to 60 parts by weight of the graft copolymer (B) in relation to the total (100 parts by weight) of the vinyl copolymer (A) and the graft copolymer (B). When the vinyl copolymer (A) is in excess of 90 parts by weight and the graft copolymer (B) is less than 10 parts by weight, the molded article will suffer from reduced impact resistance and chemical resistance. The thermoplastic resin composition is preferably prepared by blending up to 80 parts by weight of the vinyl copolymer (A) and at least 20 parts by weight of the graft copolymer (B). In the meanwhile, when the vinyl copolymer (A) is less than 40 parts by weight and the graft copolymer (B) is in excess of 60 parts by weight, melt viscosity of the thermoplastic resin composition will be increased to detract from the moldability. The thermoplastic resin composition is preferably prepared by blending at least 50 parts by weight of the vinyl copolymer (A) and up to 50 parts by weight of the graft copolymer (B).

A characteristic feature of the thermoplastic resin composition of the present invention is that the acetone-soluble content (C) has a number average molecular weight of 65,000 to 90,000. Of the vinyl copolymer (A) and the graft copolymer (B) in the molded article, the chemical resistance is largely dependent on the component not grafted to the rubbery polymer (r) (the acetone-soluble content (C)) compared to the graft component having higher chemical resistance. In the meanwhile, the component not grafted to the rubbery polymer (r) has a relatively high flowability. Accordingly, the present invention focused on the acetone-soluble content (C) in various components of the thermoplastic resin composition. In order to improve the chemical resistance, it is effective to suppress the permeation of the chemical agent that became in contact with the molded article, and more specifically, it is effective to enhance entanglement of the molecular chain by increasing the molecular weight and to increase intermolecular force to thereby enhance interaction between the molecular chains. The thermoplastic resin composition of the present invention uses a vinyl copolymer (A) constituted from a monomer mixture (a) containing 10 to 50% by weight of a cyanated vinyl monomer (a3) to thereby enhance interaction between the molecular chains of the acetone-soluble content (C) and suppress the permeation of the chemical agent between the molecular chains, and in addition, the number average molecular weight of the acetone-soluble content (C) is adjusted to 65,000 to 90,000 to thereby improve the chemical resistance while retaining the moldability. When the number average molecular weight of the acetone-soluble content (C) is less than 65,000, the molded article exhibits reduced chemical resistance, and in particular, reduced chemical resistance in TD. In the meanwhile, when the number average molecular weight of the acetone-soluble content (C) is in excess of 90,000, the thermoplastic resin composition will have a reduced moldability. When the content of the cyanated vinyl monomer (a3) in the monomer mixture (a) constituting the vinyl copolymer (A) is less than 10% by weight, the molded article will have poor chemical resistance, and in particular, poor chemical resistance in TD due to the weak interaction between the molecular chains inviting permeation of the chemical agent between the molecular chains even if the acetone-soluble content (C) has a number average molecular weight of 65,000 to 90,000.

Exemplary method for adjusting the number average molecular weight of the acetone-soluble content (C) to the range of 65,000 to 90,000 include (1) a method of combining a vinyl copolymer (A) having a relatively high molecular weight with a graft copolymer (B) wherein the acetone-soluble content has a relatively low molecular weight; (2) a method of combining a vinyl copolymer (A) having a molecular weight which is substantially the same as the target molecular weight with a graft copolymer (B) wherein the acetone-soluble content has a molecular weight which is substantially the same as the target molecular weight; and (3) a method of combining a vinyl copolymer (A) having a relatively low molecular weight with a graft copolymer (B) wherein the acetone-soluble content has a relatively high molecular weight. Of these, the preferred is the method (1) in view of improving the moldability, and more specifically, the method wherein the vinyl copolymer (A) having a number average molecular weight of 80,000 to 100,000 and the graft copolymer (B) having the number average molecular weight of the acetone-soluble content of 30,000 to 50,000 g are combined.

In the thermoplastic resin composition of the present invention, dispersity of the acetone-soluble content (C) is preferably in the range of 2.0 to 2.5. When the dispersity of the acetone-soluble content (C) is at least 2.0, production of the thermoplastic resin composition will be facilitated. In the meanwhile, when the dispersity of the acetone-soluble content (C) is up to 2.5, moldability of the thermoplastic resin composition as well as chemical resistance of the molded article will be improved.

The number average molecular weight and the dispersity of the acetone-soluble content (C) of the thermoplastic resin composition may be measured by a procedure similar to the vinyl copolymer (A) by separating the acetone-insoluble content from the thermoplastic resin composition and concentrating the filtrate by using a rotary evaporator, and measuring the acetone-soluble content (C).

The thermoplastic resin composition of the present invention preferably has a content of the component having a molecular weight of at least 250,000 (namely, the high molecular weight component) in the acetone-soluble content (C) of 15 to 30% by weight. Since such high molecular weight component greatly contributes for the improvement of the chemical resistance of the molded article, a certain amount of such high molecular weight component should be included in the acetone-soluble content (C). When the content of the component having a molecular weight of at least 250,000 in the acetone-soluble content (C) is at least 15% by weight, the molded article will have an improved chemical resistance, and in particular, improved chemical resistance in TD. In the meanwhile, when the content of the component having a molecular weight of at least 250,000 in the acetone-soluble content (C) is up to 30% by weight, the thermoplastic resin composition will have improved moldability.

The thermoplastic resin composition of the present invention preferably has a content of the component having a molecular weight of less than 50,000 (namely, the low molecular weight component) in the acetone-soluble content (C) of less than 30% by weight and more preferably less than 25% by weight. Since such low molecular weight component greatly contributes for the improved moldability of the thermoplastic resin composition, certain amount of such low molecular weight component should be included in the acetone-soluble content (C). The content is preferably at least 5% by weight and more preferably at least 10% by weight. In the meanwhile, when the content of the component having a molecular weight of less than 50,000 in the acetone-soluble content (C) is up to 30% by weight, the molded article will have an improved chemical resistance.

An exemplary method for controlling the molecular weight distribution of the acetone-soluble content (C) to the range as described above is combination of 40 to 90 parts by weight and more preferably 65 to 90 parts by weight of a vinyl copolymer (A) having the number average molecular weight of 80,000 to 100,000 and the dispersity of up to 2.0 with 10 to 60 parts by weight and more preferably 10 to 35 parts by weight of a graft copolymer (B) having the number average molecular weight of the acetone-soluble content of 30,000 to 50,000 and the dispersity of 2.0 to 2.5.

The molecular weight distribution of the acetone-soluble content (C) of the thermoplastic resin composition may be determined by separating the acetone-insoluble content from the thermoplastic resin composition and concentrating the filtrate by a rotary evaporator to obtain the acetone-soluble content (C), and determining the molecular weight distribution from the GPC chromatogram of the acetone-soluble content (C) prepared by a procedure similar to the vinyl copolymer (A).

In the present invention, the acetone-soluble content (C) of the thermoplastic resin composition preferably has an acrylonitrile content of 8 to 50% by weight, and the acetone-insoluble content (D) of the thermoplastic resin composition preferably has an acrylonitrile content of 1 to 5% by weight. It is to be noted that the "acrylonitrile content" as used in the present invention designates content of the units from the acrylonitrile.

The acrylonitrile content in the acetone-soluble content (C) represents amount of the acrylonitrile from the vinyl copolymer (A) and the acetone-soluble content of the graft copolymer (B), and it contributes for the improvement of the chemical resistance of the molded article. In the meanwhile, the acrylonitrile content of the acetone-insoluble content (D) represents amount of the acrylonitrile from the graft components of the graft copolymer (B), and it contributes for the improvement of the color tone of the molded article.

When the acrylonitrile content in the acetone-soluble content (C) of thermoplastic resin composition is at least 8% by weight, the molded article will have improved chemical resistance. In the meanwhile, when the acrylonitrile content in the acetone-soluble content (C) is up to 50% by weight, the molded article will have improved color tone.

When the acrylonitrile content in the acetone-insoluble content (D) of the thermoplastic resin composition is at least 1% by weight, the molded article will have improved chemical resistance. In the meanwhile, when the acrylonitrile content in the acetone-insoluble content (D) is up to 5% by weight, the molded article will have improved color tone.

Acrylonitrile content in the acetone-soluble content (C) and the acetone-insoluble content (D) may be determined by the procedure as described below. First, 80 ml of acetone is added to about 1 g of the sample of the thermoplastic resin composition, and the mixture is refluxed in a hot water bath at 70° C. for 3 hours, and subjected to centrifugation at 8000 r.p.m (10000 G) for 40 minutes. The insoluble content is separated by filtration to obtain acetone-insoluble content (D). In the meanwhile, the filtrate is concentrated by a rotary evaporator to obtain the acetone-soluble content (C). The acetone-insoluble content (D) and the acetone-soluble content (C) are respectively dried at a reduced pressure at 80° C. for 5 hours, and pressed by a hot press set at 230° C. to prepare a film having a thickness of 30±5 μm. The resulting film is subjected to FT-IR analysis, and the content of the acrylonitrile is determined from the intensity ratio of the following peaks on the FT-IR chart.

Aromatic vinyl monomers (a1) and (b1): the peak at 1605 cm$^{-1}$ corresponding to vibration of the benzene nucleus Unsaturated alkyl carboxylate ester monomers (a2) and (b2): the peak at 1730 cm$^{-1}$ corresponding to stretching vibration of the carbonyl group C=O of the ester Cyanated vinyl monomers (a3) and (b3): the peak at 2240 cm$^{-1}$ corresponding to —C≡N stretching Rubbery polymer (r): the peak at 960 cm$^{-1}$ corresponding to C=C The acrylonitrile content in the acetone-soluble content (C) of the thermoplastic resin composition and the acrylonitrile content in the acetone-insoluble content (D) of the thermoplastic resin composition may be controlled to the range as described above, for example, by limiting the composition of the vinyl copolymer (A) and the graft copolymer (B) to the preferable range as described above.

The proportion of the triplet sequence of the units from the acrylonitrile included in the acetone-soluble content (C) of the thermoplastic resin composition of the present invention is not particularly limited. The proportion, however, is preferably up to 10% by weight, more preferably up to 8% by weight, and still more preferably up to 5% by weight in the total (100% by weight) of the acetone-soluble content (C).

The triplet sequence of the units from the acrylonitrile is the segment represented by the following formula (1). When the copolymer having such segment is exposed to high temperature, intramolecular cyclization as shown by the following formula (2) is likely to be promoted and this may result in the coloring. However, such coloring can be suppressed when the triplet sequence is up to 10% by weight.

[Chemical formula 1]

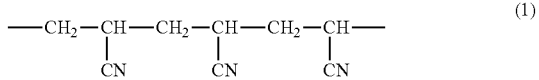

(1)

[Chemical formula 2]

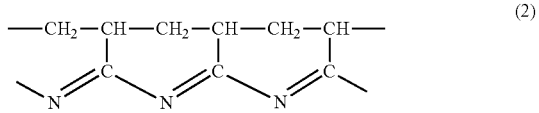

(2)

The thermoplastic resin composition of the present invention may also include additional thermoplastic resin or additional thermosetting resin to the extent not adversely affecting the object of the present invention. Examples of such additional thermoplastic resin include polyimide resins, polyphenylene sulfide resins, polyether ether ketone resins, polylactate resins or other polyester resins, polysulfone resins, polyether sulfone resins, aromatic or aliphatic polycarbonate resins, polyallylate resins, polyphenylene oxide resins, polyacetal resins, polyimide resins, polyetherimide resins, aromatic or aliphatic polyketone resins, fluororesins, polyvinyl chloride resins, polyvinylidene chloride resins, vinyl ester resins, cellulose acetate resins, and polyvinyl alcohol resins. Examples of the thermosetting resin include phenol resins, melamine resins, polyester resins, silicone resins, and epoxy resins, which may be used in combination of two or more.

The thermoplastic resin composition of the present invention may further contain an inorganic filler such as glass fiber, glass powder, glass beads, glass flake, alumina, alumina fiber, carbon fiber, graphite fiber, stainless steel fiber, whisker, potassium titanate fiber, wollastonite, asbestos, hard clay, calcined silica, talc, kaolin, mica, calcium carbonate, magnesium carbonate, aluminum oxide, or a mineral; an antioxidant such as hindered phenol antioxidant, sulfur-containing compound or phosphorus-containing organic compound antioxidant; a thermal stabilizer such as phenol or acrylate thermal stabilizer; a UV absorbent such as benzotriazole, benzophenone, or salicylate UV absorbent; a hindered amine light stabilizer; a lubricant or plasticizer such as higher fatty acid, acid ester, acid amide, or higher alcohol lubricant or plasticizer; a mold release agent such as montanic acid or it salt, ester, or half ester, stearyl alcohol, stearamide, or ethylene wax; a flame retardant; a flame retarding aid; an anti-coloring agent such as phosphorate or hypophosphorate; a neutralizer such as phosphoric acid, monosodium phosphate, maleic anhydride, or succinic anhydride; a nucleating agent; an antistatic agent such as amine, sulfonic acid, polyether antistatic agent; and a colorant such as carbon black, pigment, and dye, which may be blended to the extent not adversely affecting the present invention.

Next, the method for producing the thermoplastic resin composition of the present invention is described. The thermoplastic resin composition of the present invention can be produced, for example, by melt kneading the vinyl copolymer (A), the graft copolymer (B), and optional other components as described above. More preferably, the thermoplastic resin composition of the present invention is produced by producing the vinyl copolymer (A) by continuous bulk polymerization, and then continuously melt kneading with the graft copolymer (B) and other optional components.

FIG. 1 is a schematic view showing a preferable embodiment of the apparatus used in producing the thermoplastic resin composition of the present invention. The production apparatus of the thermoplastic resin composition shown in FIG. 1 has a reaction tank (1) for producing the vinyl copolymer (A), a preheater (2) for heating the resulting vinyl copolymer (A) to the predetermined temperature, and a twin screw extruder-type monomer remover (3) which are linked, and also, a twin screw extruder-type feeder (5) connected to the twin screw extruder-type monomer remover (3) for feeding the graft copolymer (B) from side of the twin screw extruder-type monomer remover (3). The reactor tank (1) has an agitator (helical ribbon impeller) (7), and the twin screw extruder-type monomer remover (3) has a vent port (8) for removing volatile components including monomers which are left unreacted.

The reaction product continuously fed from the reactor tank (1) is heated to the predetermined temperature by the preheater (2), and then, fed to the twin screw extruder-type monomer remover (3). In the twin screw extruder-type monomer remover (3), the volatile components such as the monomers that failed to undergo the reaction are removed from the reaction system generally at a temperature of approximately 150 to 280° C. and at normal or reduced pressure from the vent port (8). This removal of the volatile components is generally conducted until the volatile components is reduced to the predetermined content, for example, to the content of up to 10% by weight and more preferably up to 5% by weight. The removed volatile components are preferably recycled into the reactor tank (1).

The graft copolymer (B) is fed to the twin screw extruder-type monomer remover (3) from the twin screw extruder-type feeder (5) through the inlet at a position near the downstream side of the twin screw extruder-type monomer remover (3). The twin screw extruder-type feeder (5) preferably has a heater, so that the graft copolymer (B) in half-melted or melted state can be fed to the twin screw extruder-type monomer remover (3) to improve the degree of melting. The graft copolymer (B) is generally heated to a temperature of 100 to 220° C. An exemplary twin screw extruder-type feeder (5) is a twin screw extruder-type feeder comprising a screw, a cylinder, and a screw drive, the cylinder having the heating and cooling function.

Preferably, the content of the non-reacted monomers is already reduced to the degree of up to 10% by weight, and more preferably up to 5% by weight at the position of the twin screw extruder-type monomer remover (3) where it is connected to the twin screw extruder-type feeder (5) to thereby suppress thermal degradation of the rubber component in the subsequent operation of removing the non-reacted monomers.

The vinyl copolymer (A) and the graft copolymer (B) are melt kneaded in a melt kneading zone (4) in the twin screw extruder-type monomer remover (3) in the downstream of the position where the twin screw extruder-type feeder (5) is connected to the twin screw extruder-type monomer remover (3), and the thermoplastic resin composition is ejected to the exterior of the reaction system from the ejection port (6). Preferably, a water inlet port (9) is provided in the melt kneading zone (4) for addition of the predetermined amount of water, and the introduced water and the volatile components such as non-reacted monomers are removed from the reaction system from the final vent port (10) provided in further downstream.

The thermoplastic resin composition of the present invention can be molded by any molding method. Exemplary molding methods include injection molding, extrusion molding, inflation molding, blow molding, vacuum molding, compression molding, and gas assisted molding, and the preferred is use of injection molding. In the case of the injection molding, the cylinder temperature is preferably 210 to 320° C. and the mold temperature is preferably 30 to 80° C.

The thermoplastic resin composition of the present invention may be widely used as molded articles of any shape. Exemplary molded articles include film, sheet, fiber, fabric, nonwoven fabric, injection molded article, extrusion molded article, molded article produced by vacuum forming or pressure molding, blow molded article, and any of these combined with other materials.

The thermoplastic resin composition of the present invention has excellent moldability, and it is capable of producing a molded article having excellent chemical resistance, and in particular, excellent chemical resistance in TD, which is well adapted for use in applications including home appliance, communications equipment, miscellaneous goods, and medical equipment.

EXAMPLES

Next, the present invention is described in further detail by referring to the Examples which by no means limit the present invention. First, the evaluation methods used in the Examples are described.

(1) Weight Average Particle Diameter of the Rubbery Polymer

Latex of the rubbery polymer (r) was diluted with an aqueous medium for dispersion, and particle size distribution was measured by a laser scattering and diffractometry-particle size distribution analyzer "LS 13 320" (Beckman Coulter, Inc). The weight average particle diameter of the rubbery polymer (r) was calculated by the particle size distribution.

(2) Molecular Weight and Dispersity

The sample (about 0.03 g) of the vinyl copolymer (A), the acetone-soluble content of the graft copolymer (B), and the acetone-soluble content (C) in the thermoplastic resin composition was respectively dissolved in about 15 g of tetrahydrofuran to prepare a solution of about 0.2% by weight. The number average molecular weight and the dispersity were calculated from the GPC chromatogram obtained by the measurement under the following conditions by using polymethyl methacrylate for the standard. For the acetone-soluble content (C) of the thermoplastic resin composition, content of the component having a molecular weight of at least 250,000 and content of the component having a molecular weight of less than 50,000 were calculated.

Apparatus: Waters 2695
Column temperature: 40° C.
Detector: RI2414 (differential refractive index detector)
Flow rate of carrier eluent: 0.3 ml/minute (solvent, tetrahydrofuran)
Column: TSKgel Super HZM-M (6.0 mm I.D.×15 cm), TSKgel Super HZM-N (6.0 mm I.D.×15 cm), serial (both produced by Tosoh).

(3) Graft Ratio of the Graft Copolymer (B)

80 ml of acetone was added to about 1 g of the sample of the graft copolymer (B) (m: mass of the sample), and the mixture was refluxed in a hot water bath at 70° C. for 3 hours, and subjected to centrifugation at 8000 r.p.m (10000 G) for 40 minutes. The insoluble content was separated by filtration. After drying the resulting acetone-insoluble content at a reduced pressure at 80° C. for 5 hours, the mass (n) was measured, and the graft ratio was calculated by the following equation wherein X is content of the rubbery polymer in the graft copolymer (B).

Graft ratio (%)={[(n)−(m)×X]/[(m)×X]}×100

(4) Content of Acrylonitrile in the Acetone-Soluble Content (C) and the Acetone-Insoluble Content (D) of the Thermoplastic Resin Composition 80 ml of acetone was added to about 1 g of the sample of the thermoplastic resin composition, and the mixture was refluxed in a hot water bath at 70° C. for 3 hours, and subjected to centrifugation at 8000 r.p.m (10000 G) for 40 minutes. The insoluble content was separated by filtration to obtain acetone-insoluble content (D). In the meanwhile, the filtrate was concentrated by a rotary evaporator to obtain precipitate of the acetone-soluble content (C). The acetone-insoluble content (D) and the acetone-soluble content (C) were respectively dried at a reduced pressure at 80° C. for 5 hours, and pressed at an elevated pressure by a hot press set at 230° C. to prepare a film having a thickness of 30±5 μm. The resulting film was subjected to FT-IR analysis, and the content of the acrylonitrile was determined from the intensity ratio of the following peaks in the FT-IR chart.

Aromatic vinyl monomers (a1) and (b1): the peak at 1605 $cm^{-1}$ corresponding to vibration of the benzene nucleus Unsaturated alkyl carboxylate ester monomers (a2) and (b2): the peak at 1730 $cm^{-1}$ corresponding to stretching vibration of the carbonyl group C=O of the ester Cyanated vinyl monomers (a3) and (b3): the peak at 2240 $cm^{-1}$ corresponding to stretching Rubbery polymer (r): the peak at 960 $cm^{-1}$ corresponding to C=C (5) Refractive Index of the Vinyl Copolymer (A) and the Graft Component (Acetone-Insoluble Content) of the Graft Copolymer (B)

A film was prepared from the acetone-insoluble content of the graft copolymer (B) by the procedure described in (4). A film of the vinyl copolymer (A) was also prepared by the procedure described in (4). A small amount of 1-bromonaphthalene was dropped on to the resulting films and refractive index was measured using Abbe refractometer under the following conditions:

Light source: D line from sodium lamp
Measurement temperature: 23° C.

(6) Proportion of the Triplet Sequence of the Acrylonitrile Monomer Unit in the Acetone-Soluble Content (C) of the Thermoplastic Resin Composition The acetone-soluble content (C) obtained by the procedure of (4) was used for the sample, and by using the phenomenon that the signal shift of the α-carbon of the acrylonitrile monomer unit in the $^{13}$C-NMR somewhat differs by the difference of the adjacent monomer type, proportion of the triplet sequence was quantitated from the integral value of the signal, and weight fraction of the acrylonitrile monomer unit in the center of the triplet sequence in the entire monomer units was calculated. The measurement conditions used in the $^{13}$C-NMR are as described below.

Apparatus: JEOL J NM-GSX400
Observation frequency: 100.5 MHz
Solvent: DMSO-$d_6$
Concentration: 445 mg/2.5 ml
Standard for the chemical shift: $Me_4Si$
Temperature: 110° C.
Observation width: 20000 Hz
Data point: 32K
Flip angle: 90° (21 μs)
Pulse delay time: 5.0 s
Cumulative number: 8400
Decoupling: gated decoupling (without NOE)
Acrylonitrile sequence assignment (A: acrylonitrile, S: styrene): -A-A-A- 118.6 to 119.2 ppm, -A-A-S- 119.3 to 120.2 ppm, -S-A-S- 120.2 to 121.3 ppm.

(7) Transparency (Haze Value)

The pellets of the thermoplastic resin composition produced in the Examples and Comparative Examples were dried in a hot air dryer at 80° C. for 3 hours, and charged in SE-50DU molding machine manufactured by SUMITOMO HEAVY INDUSTRIES, LTD. with the cylinder temperature set at 230° C. A square plate molded article having a thickness of 3 mm was immediately formed. The resulting 5 square plate molded articles were evaluated for their haze value (%) by using direct-reading haze meter manufactured by TOYO SEIKI Co., Ltd., and the number average was calculated.

(8) Color Tone (YI)

The pellets of the thermoplastic resin composition produced in the Examples and Comparative Examples were dried in a hot air dryer at 80° C. for 3 hours, and charged in SE-50DU molding machine manufactured by SUMITOMO HEAVY INDUSTRIES, LTD. with the cylinder temperature set at 230° C. A square plate molded article having a thickness of 3 mm was immediately formed. The resulting 5 square plate molded articles were evaluated for their YI value according to JIS K7103 (enacted in 1971), and the number average was calculated.

(9) Impact Resistance (Charpy Impact Strength)

The pellets of the thermoplastic resin composition produced in the Examples and Comparative Examples were dried in a hot air dryer at 80° C. for 3 hours, and charged in SE-50DU molding machine manufactured by SUMITOMO HEAVY INDUSTRIES, LTD. with the cylinder temperature set at 230° C. Dumbbell-shaped molded articles having a thickness of 4 mm were immediately formed. The resulting 5 dumbbell-shaped test pieces were evaluated for their Charpy impact strength by the procedure according to ISO 179, and the number average was calculated.

(10) Moldability (Melt Flow Rate, MFR)

The pellets of the thermoplastic resin composition produced in the Examples and Comparative Examples were dried in a hot air dryer at 80° C. for 3 hours, and the MFR was measured by a method in accordance with ISO 113 under the conditions of measurement temperature of 220° C. and load of 98 N.

(11) Chemical Resistance

Figure 2:
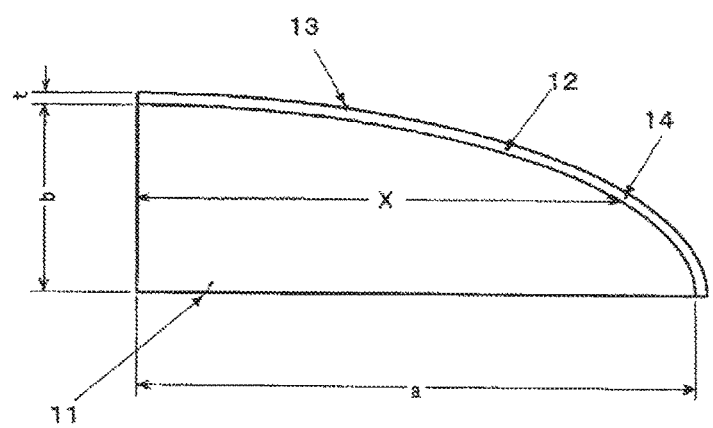
FIG. 2 is a schematic view showing evaluation method of the chemical resistance used in Examples and Comparative Examples.

The pellets of the thermoplastic resin composition produced in the Examples and Comparative Examples were dried in a hot air drier at 80° C. for 3 hours, and filled in a molding machine (SE-50DU manufactured by SUMITOMO HEAVY INDUSTRIES, LTD.) with the cylinder temperature adjusted to 250° C., and two square plates each having the size of 150 mm (length)×150 mm (width)×2 mm (thickness) and 150 mm (length)×150 mm (width)×1.5 mm (thickness) were immediately molded. The gate of these square molded articles was a pin gate at the center of one side. Test pieces were cut from the resulting molded article, and a test piece having a length of 150 mm, a width of 12.5 mm, and a thickness of 1.5 mm was cut from the center of the molded article in MD direction as the test piece for use as "the test piece in MD", and a test piece having a length of 150 mm, a width of 12.5 mm, and a thickness of 2 mm was cut from the position at 117.5 mm from the gate of the molded article in TD direction as the test piece for use as "the test piece in TD". Each of the MD and TD test pieces was fixedly secured along the ¼ oval jig (11) shown in FIG. 2. The length of the major axis (a) of the ¼ oval jig was 127 mm, and the length of the minor axis (b) was 38 mm.

Then, in the test wherein the chemical reagent used was Ultra Attack Neo, the Ultra Attack Neo with no dilution was coated over the entire surface of the test piece (12) fixedly secured to the ¼ oval jig (11), and the test piece was allowed to stand at room temperature (23° C.) and humidity of 50% for 72 hours. In the test wherein the chemical reagent used was rubbing alcohol, rubbing alcohol (50% by weight aqueous solution of ethanol) was coated over the entire surface of the test piece, and the test piece was allowed to stand at room temperature (23° C.) and humidity of 50% for 24 hours. The test piece after the settling was evaluated for its chemical resistance in MD and TD by the procedure as described below.

(11-1) Chemical Resistance in MD

The test piece after the standing was removed from the ¼ oval jig, and the removed test piece was compulsorily bent along the curvature of the C size battery with the surface of test piece coated with the chemical reagent facing outside, and the test piece was again fixed on the ¼ oval jig. The test piece was visually confirmed for crack generation, and distance X from the end of the test piece on the minor axis side of the ¼ oval jig to the crack generation position 14 was determined to calculate the critical strain (ε) by the following equation (Equation 1):

$$\varepsilon(\%) = \{bt/2a^2\} \times \{1-X^2(a^2-b^2)/a^4\}^{-3/2} \times 100 \quad \text{(Equation 1)}$$

a: major axis of the jig (=127 mm)
b: minor axis of the jig (=38 mm)
t: thickness of the test piece (=1.5 mm)
X: distance from the generated crack (mm)

(11-2) Chemical Resistance in TD

Figure 3:
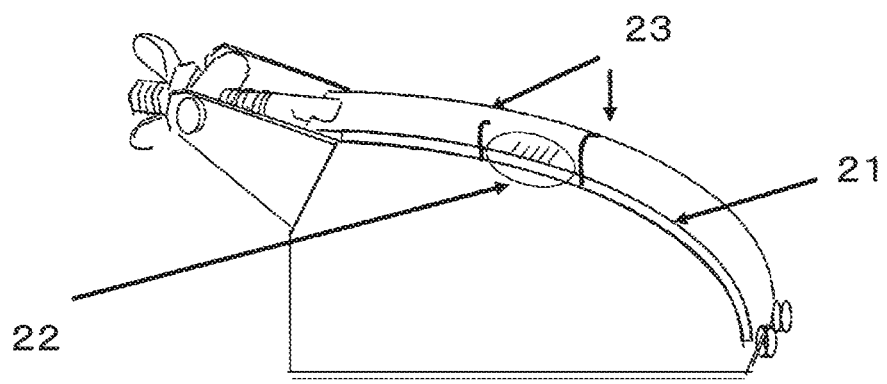
FIG. 3 is a schematic view showing typical criteria in the evaluation of the chemical resistance in TD in Examples and Comparative Examples.

The test piece after settling was visually observed for the generation of cracks in the area of the test piece where the strain was less than 1%, and the observation was evaluated by the following criteria. Typical example of the criteria is shown in FIG. 3.

No crack or craze (21): A
Craze found only on the test piece surface (22): B
Cracks extending to the interior of the test piece (23): C (Production Example 1) Graft Copolymer (B-1)

A four neck flask (internal volume 5 litters) equipped with agitator blades was charged with 50 parts by weight (in terms of the solid content) of polybutadiene latex (weight average particle diameter of the rubber, 0.30 μm; gel content, 85%; refractive index, 1.516), 130 parts by weight of pure water, 0.4 part by weight of sodium laurate, 0.2 part by weight of glucose, 0.2 part by weight of sodium pyrophosphate, and 0.01 part by weight ferrous sulfate, and after purging with nitrogen, the temperature was adjusted to 60° C. With stirring, a monomer mixture of 3.6 parts by weight of styrene, 0.6 parts by weight of acrylonitrile, 10.8 parts by weight of methyl methacrylate, and 0.15 parts by weight of t-dodecyl mercaptan was initially added in 45 minutes.

Next, an initiator mixture of 0.3 parts by weight of cumene hydroperoxide, 1.6 parts by weight of sodium laurate (emulsifier), and 25 parts by weight of pure water was continuously added dropwise in 5 hours. Simultaneously, a monomer mixture of 8.4 parts by weight of styrene, 1.4 parts by weight of acrylonitrile, 25.2 parts by weight of methyl methacrylate, and 0.36 parts by weight of t-dodecyl mercaptan was continuously added dropwise in 5 hours. After additional dropwise addition of the monomer mixture, the mixture was allowed to stand for 1 hour, and the polymerization was terminated. The resulting graft copolymer latex was coagulated with 1.5% by weight of sulfuric acid, neutralized with sodium hydroxide, washed, centrifuged, and dried to obtain a powder graft copolymer (B-1) (monomer ratio: 24% by weight of styrene, 4% by weight of acrylonitrile, and 72% by weight of methyl methacrylate). The acetone-insoluble content of the resulting graft copolymer (B-1) had a refractive index of 1.517 and difference in refractive index with the rubbery polymer of 0.001. The graft ratio was 47%. The acetone-soluble content had a number average molecular weight of 34,000, and the dispersity was 2.2.

(Production Example 2) Graft Copolymer (B-2)

The procedure of Production Example 1 was repeated except that the amount of the t-dodecyl mercaptan in the monomer mixture initially added was 0.09 parts by weight and the amount of the t-dodecyl mercaptan in the monomer mixture additionally added was 0.22 parts by weight to obtain a graft copolymer (B-2) (monomer ratio: 24% by weight of styrene, 4% by weight of acrylonitrile, and 72% by weight of methyl methacrylate). The acetone-insoluble content of the graft copolymer (B-2) had a refractive index of 1.516, and difference with the refractive index of the rubbery polymer of 0.000. The graft ratio was 55%. The acetone-soluble content had a number average molecular weight of 65,000 and a dispersity of 2.4.

(Production Example 3) Graft Copolymer (B-3)

The procedure of Production Example 1 was repeated except that the amount of the t-dodecyl mercaptan in the monomer mixture initially added was 0.225 parts by weight and the amount of the t-dodecyl mercaptan in the monomer mixture additionally added was 0.54 parts by weight to obtain a graft copolymer (B-3) (monomer ratio: 24% by weight of styrene, 4% by weight of acrylonitrile, and 72% by weight of methyl methacrylate). The acetone-insoluble content of the graft copolymer (B-3) had a refractive index of 1.517, and difference with the refractive index of the rubbery polymer of 0.001. The graft ratio was 39%. The acetone-soluble content had a number average molecular weight of 23,000 and a dispersity of 2.0.

TABLE 1

| | | Rubbery polymer (r) | | Vinyl monomer mixture (b) | | | | | Acetone-insoluble content (grafted component) | Acetone-soluble content | |
|---|---|---|---|---|---|---|---|---|---|---|---|
| | | Refractive index | Content of rubbery | Content of vinyl | Composition of the charge | | | | Refractive index | | |
| Graft co-polymer | Type of the rubber | (bibliographical value) | polymer (% by weight) | monomer (% by weight) | (b1) (% by weight) | (b2) (% by weight) | (b3) (% by weight) | Graft ratio (%) | (Abbe refractive index) | Number average molecular weight | Dispersity |
| B-1 | Polybutadiene rubber | 1.516 | 50 | 50 | 24 | 72 | 4 | 47 | 1.517 | 34,000 | 2.2 |
| B-2 | Polybutadiene rubber | 1.516 | 50 | 50 | 24 | 72 | 4 | 55 | 1.516 | 65,000 | 2.4 |
| B-3 | Polybutadiene rubber | 1.516 | 50 | 50 | 24 | 72 | 4 | 39 | 1.517 | 23,000 | 2.0 |

Example 1

Copolymerization of the vinyl copolymer and production of the thermoplastic resin composition by the method as described below by using a continuous bulk polymerizer apparatus comprising a 2 m³ complete mixing polymerization tank having a condenser for evaporation and dry distillation of the monomer vapor and a helical ribbon impeller, a single screw extruder-type preheater, a twin screw extruder-type monomer remover, and a twin screw extruder-type feeder connected to the barrel of the monomer remover at a position ⅓ upstream of the downstream (exit) end of the monomer remover for feeding from the side of the monomer remover.

First, a monomer mixture (a) comprising 22 parts by weight of styrene, 15 parts by weight of acrylonitrile, 63 parts by weight of methyl methacrylate, 0.11 part by weight of n-octylmercaptan, and 0.015 parts by weight of 1,1-bis(t-butylperoxy)cyclohexane was continuously supplied to a complete mixing polymerization tank at a rate of 150 kg/hour, and continuous bulk polymerization was conducted while maintaining the polymerization temperature of 130° C. and tank interior pressure of 0.08 MPa. The polymerization rate of the polymerization reaction mixture at the exit of the complete mixing polymerization tank was controlled to the level of 65±30.

After preheating the polymerization reaction mixture in the single screw extruder-type preheater, the reaction mixture was fed to the twin screw extruder-type monomer remover to recover the non-reacted monomers from the vent port of the twin screw extruder-type monomer remover by evaporation at reduced pressure. The recovered non-reacted monomers were continuously refluxed to the complete mixing polymerization tank. At the position ⅓ (in relation to the total length) upstream of the downstream end of the twin screw extruder-type monomer remover, 0.225 kg/hour of t-butylhydroxytoluene (a phenol stabilizer), 0.225 kg/hour of tri(nonylphenyl) phosphite (a phosphorus stabilizer), and 60.7 kg/hour of the graft copolymer (B-1) produced in the Production Example 1 in half molten state were added to the styrene/acrylonitrile/methyl methacrylate copolymer whose apparent polymerization rate was at least 99% by the twin screw extruder-type feeder for melt kneading with the styrene/acrylonitrile/methyl methacrylate copolymer in the twin screw extruder-type monomer remover. In this melt kneading step, water was fed at 2 kg/hour at a position ⅙ (in relation to the total length) upstream of the downstream end of the twin screw extruder-type monomer remover. This water and other volatile contents were removed from the vent port provided at further downstream of the twin screw extruder-type monomer remover by evaporation at reduced pressure. The melt kneaded mixture was ejected in the form of strands and cut by a cutter to obtain pellets of the thermoplastic resin composition. Styrene/acrylonitrile/methyl methacrylate copolymer was also ejected for sampling by stopping the feed from the twin screw extruder-type feeder. The resulting styrene/acrylonitrile/methyl methacrylate copolymer and thermoplastic resin composition were evaluated for their properties by the methods as described above.

Example 2

The procedure of Example 1 was repeated except that amount of the n-octyl mercaptan in the monomer mixture (a) was 0.18 parts by weight, and the graft copolymer (B-2) produced in the Production Example 2 was used instead of the graft copolymer (B-1) produced in the Production Example 1 to produce pellets of the thermoplastic resin composition.

Example 3

The procedure of Example 1 was repeated except that 84.3 kg/hour of the graft copolymer (B-1) produced in Production Example 1 was fed to produce the pellets of the thermoplastic resin composition.

Example 4

The procedure of Example 1 was repeated except that amount of the n-octyl mercaptan in the monomer mixture (a) was 0.15 parts by weight to produce pellets of the thermoplastic resin composition.

Example 5

The procedure of Example 1 was repeated except that the graft copolymer (B-2) produced in the Production Example 2 was used instead of the graft copolymer (B-1) produced in the Production Example 1 to produce pellets of the thermoplastic resin composition.

Comparative Example 1

The procedure of Example 1 was repeated except that amount of the n-octyl mercaptan in the monomer mixture (a) was 0.21% by weight to produce pellets of the resin composition.

Comparative Example 2

The procedure of Example 1 was repeated except that the graft copolymer (B-3) produced in the Production Example 3 was used instead of the graft copolymer (B-1) produced in the Production Example 1 to produce pellets of the thermoplastic resin composition.

Comparative Example 3

The procedure of Example 1 was repeated except that 122.7 kg/hour of the graft copolymer (B-1) produced in Production Example 1 was fed to produce the pellets of the thermoplastic resin composition.

Comparative Example 4

The procedure of Example 1 was repeated except that amount of the n-octyl mercaptan in the monomer mixture (a) was 0.08 parts by weight to produce pellets of the thermoplastic resin composition.

Comparative Example 5

The procedure of Example 1 was repeated except that the composition of the monomer mixture (a) was changed to the one comprising 24 parts by weight of styrene, 4 parts by weight of acrylonitrile, 72 parts by weight of methyl methacrylate, 0.12 part by weight of n-octyl mercaptan, and 0.015 part by weight of 1,1-bis(t-butylperoxy)cyclohexane to thereby produce pellets of the resin composition.

The compositions of the thermoplastic resin compositions are shown in Table 2, and results of the evaluation are shown in Table 3 to 4.

TABLE 2

| | Vinyl copolymer (A) | | | | | | | | | Graft copolymer (B) | | |
|---|---|---|---|---|---|---|---|---|---|---|---|---|
| | Charge composition of the vinyl monomers | | | Number average | | | | | | | | |
| | (a1) (% by weight) | (a2) (% by weight) | (a3) (% by weight) | molecular weight | Dispersity | Refractive index | Solubility parameter $(J/cm^3)^{1/2}$ | Feed rate (kg/h) | Parts (parts by weight) | Type | Feed rate (kg/h) | Parts (parts by weight) |
| Example 1 | 22 | 63 | 15 | 95000 | 1.8 | 1.516 | 21.5 | 150 | 71.2 | B-1 | 60.7 | 28.8 |
| Example 2 | 22 | 63 | 15 | 70000 | 1.8 | 1.516 | 21.5 | 150 | 71.2 | B-2 | 60.7 | 28.8 |
| Example 3 | 22 | 63 | 15 | 95000 | 1.8 | 1.516 | 21.5 | 150 | 64 | B-1 | 84.3 | 36 |
| Example 4 | 22 | 63 | 15 | 80000 | 1.8 | 1.516 | 21.5 | 150 | 71.2 | B-1 | 60.7 | 28.8 |
| Example 5 | 22 | 63 | 15 | 95000 | 1.8 | 1.516 | 21.5 | 150 | 71.2 | B-2 | 60.7 | 28.8 |
| Comp. Example 1 | 22 | 63 | 15 | 65000 | 1.9 | 1.516 | 21.5 | 150 | 71.2 | B-1 | 60.7 | 28.8 |
| Comp. Example 2 | 22 | 63 | 15 | 95000 | 1.8 | 1.516 | 21.5 | 150 | 71.2 | B-3 | 60.7 | 28.8 |
| Comp. Example 3 | 22 | 63 | 15 | 95000 | 1.8 | 1.516 | 21.5 | 150 | 55 | B-1 | 122.7 | 45 |
| Comp. Example 4 | 22 | 63 | 15 | 110000 | 2.0 | 1.516 | 21.5 | 150 | 71.2 | B-1 | 60.7 | 28.8 |
| Comp. Example 5 | 24 | 72 | 4 | 95000 | 1.8 | 1.517 | 20.3 | 150 | 71.2 | B-1 | 60.7 | 28.8 |

TABLE 3

| | Acetone-soluble content (C) | | | | | | Acetone-insoluble content (D) |
|---|---|---|---|---|---|---|---|
| | Number average molecular weight | Dispersity | Components having a molecular weight of at least 250,000 (% by weight) | Components having a molecular weight of less than 50,000 (% by weight) | Acrylonitrile content (% by weight) | Proportion of triplet sequence of acrylonitrile monomer unit (%) | Acrylonitrile content (% by weight) |
| Example 1 | 75000 | 2.3 | 23 | 16 | 13 | 2 | 2 |
| Example 2 | 66000 | 2.0 | 24 | 8 | 13 | 2 | 2 |
| Example 3 | 67000 | 2.4 | 22 | 31 | 12 | 2 | 2 |
| Example 4 | 65000 | 2.2 | 20 | 15 | 13 | 2 | 2 |
| Example 5 | 88000 | 2.2 | 28 | 6 | 13 | 2 | 2 |
| Comp. Example 1 | 59000 | 2.2 | 11 | 24 | 13 | 2 | 2 |
| Comp. Example 2 | 64000 | 2.2 | 21 | 33 | 13 | 2 | 2 |
| Comp. Example 3 | 63000 | 2.5 | 21 | 36 | 13 | 2 | 2 |

TABLE 3-continued

| | Acetone-soluble content (C) | | | | | | Acetone-insoluble content (D) Acrylonitrile content (% by weight) |
|---|---|---|---|---|---|---|---|
| | Number average molecular weight | Dispersity | Components having a molecular weight of at least 250,000 (% by weight) | Components having a molecular weight of less than 50,000 (% by weight) | Acrylonitrile content (% by weight) | Proportion of triplet sequence of acrylonitrile monomer unit (%) | |
| Comp. Example 4 | 95000 | 2.3 | 33 | 6 | 13 | 2 | 2 |
| Comp. Example 5 | 75000 | 2.4 | 23 | 16 | 4 | up to 1 | 2 |

TABLE 4

| | Transparency | Color tone | Moldability | Impact strength | Chemical resistance | | | |
|---|---|---|---|---|---|---|---|---|
| | | | | Charpy impact | MD: critical strain (ε %) | | TD: crack generation | |
| | Haze (%) | YI | MFR (g/10 min) | strength (kJ/m$^2$) | Ultra attack neo | Rubbing alcohol | Ultra attack neo | Rubbing alcohol |
| Example 1 | 2 | 12 | 6 | 13 | 0.5 | 0.4 | A | A |
| Example 2 | 3 | 12 | 3 | 14 | 0.4 | 0.3 | A | A |
| Example 3 | 3 | 15 | 4 | 16 | 0.7 | 0.6 | A | B |
| Example 4 | 2 | 11 | 8 | 13 | 0.5 | 0.4 | A | A |
| Example 5 | 3 | 13 | 3 | 13 | 0.5 | 0.4 | A | A |
| Comp. Example 1 | 2 | 11 | 16 | 13 | 0.4 | 0.3 | C | C |
| Comp. Example 2 | 2 | 11 | 8 | 13 | 0.5 | 0.4 | C | C |
| Comp. Example 3 | 3 | 17 | 3 | 18 | 0.8 | 0.6 | C | C |
| Comp. Example 4 | 4 | 14 | up to 1 | 12 | 0.6 | 0.5 | A | A |
| Comp. Example 5 | 2 | 9 | 7 | 10 | 0.3 | 0.3 | C | C |

As demonstrated by Examples 1 to 5, the thermoplastic resin composition of the present invention is capable of producing molded articles exhibiting excellent moldability as well as excellent chemical resistance, and in particular, excellent chemical resistance in TD.

On the other hand, the chemical resistance, and in particular, chemical resistance in TD was inferior in Comparative Examples 1 to 3 wherein the acetone-soluble content (C) of the thermoplastic resin composition had a number average molecular weight of less than 65,000. The moldability was inferior in Comparative Example 4 wherein the acetone-soluble content (C) of the thermoplastic resin composition had a number average molecular weight in excess of 90,000. The chemical resistance, and in particular, chemical resistance in TD was insufficient in Comparative Example 5 wherein the composition of the monomer mixture (a) of the vinyl copolymer had been outside the scope of the present invention.

INDUSTRIAL APPLICABILITY

The thermoplastic resin composition and the molded article of the present invention are adapted for use in wide applications including home appliance, communications equipment, miscellaneous goods, and medical equipment.

EXPLANATION OF NUMERALS

1: reactor
2: preheater
3: twin screw extruder-type monomer remover
4: melt kneading zone
5: twin screw extruder-type feeder
6: discharge port
7: agitator (helical ribbon impeller)
8: vent port
9: water inlet
10: final vent port
11: ¼ oval jig
12: test piece
13: surface coated with a chemical reagent
14: crack generation site
a: major axis of the jig b: minor axis of the jig
t: thickness of the test piece
X: distance to the crack generation site
21: no craze or crack
22: craze only on the test piece surface
23: crack extending to the interior of the test piece

The invention claimed is:
1. A thermoplastic resin composition produced by blending
    40 to 90 parts by weight of a vinyl copolymer (A) prepared by copolymerization of a vinyl monomer mixture (a) comprising at least
        5 to 40% by weight of an aromatic vinyl monomer (a1),
        50 to 80% by weight of an unsaturated alkyl carboxylate ester monomer (a2), and
        10 to 50% by weight of a cyanated vinyl monomer (a3); and

10 to 60 parts by weight of a graft copolymer (B) prepared by graft copolymerization of a vinyl monomer mixture (b) comprising at least
- 10 to 30% by weight of an aromatic vinyl monomer (b1),
- 50 to 80% by weight of an unsaturated alkyl carboxylate ester monomer (b2), and
- 1 to 10% by weight of a cyanated vinyl monomer (b3)

in the presence of a rubbery polymer (r);

wherein
- acetone-soluble content (C) of the thermoplastic resin composition has a number average molecular weight of 65,000 to 90,000 based on polymethyl methacrylate standard,
- the acetone-soluble content (C) of the thermoplastic resin composition has a dispersity (Mw/Mn) of 2.0 to 2.5, and
- in a molecular weight distribution of the acetone-soluble content (C) of the thermoplastic resin composition, the proportion of the component having a molecular weight of 250,000 or more is 15 to 30% by weight and the proportion of the component having a molecular weight of less than 50,000 is less than 30% by weight.

2. A thermoplastic resin composition according to claim 1 wherein the acetone-soluble content (C) of the thermoplastic resin composition has an acrylonitrile content of 8 to 50% by weight, and acetone-insoluble content (D) of the thermoplastic resin composition has an acrylonitrile content of 1 to 5% by weight.

3. A thermoplastic resin composition according to claim 1 wherein the vinyl copolymer (A) has a number average molecular weight of 80,000 to 100,000, and acetone-soluble content of the graft copolymer (B) has a number average molecular weight of 30,000 to 50,000.

4. A thermoplastic resin composition according to claim 1 wherein the vinyl copolymer (A) has a dispersity (Mw/Mn) of up to 2.0.

5. A thermoplastic resin composition according to claim 1 wherein the acetone-soluble content of the graft copolymer (B) has a dispersity (Mw/Mn) of 2.0 to 2.5.

6. A method for producing a thermoplastic resin composition having an acetone-soluble content (C) with a number average molecular weight of 65,000 to 90,000 based on polymethyl methacrylate standard comprising the steps of:
- conducting copolymerization of a vinyl monomer mixture (a) comprising
  - 5 to 40% by weight of an aromatic vinyl monomer (a1),
  - 50 to 80% by weight of an unsaturated alkyl carboxylate ester monomer (a2), and
  - 10 to 50% by weight of a cyanated vinyl monomer (a3)

to produce a vinyl copolymer (A);
- conducting graft copolymerization of a vinyl monomer mixture (b) comprising at least
  - 10 to 30% by weight of an aromatic vinyl monomer (b1),
  - 50 to 80% by weight of an unsaturated alkyl carboxylate ester monomer (b2), and
  - 1 to 10% by weight of a cyanated vinyl monomer (b3)

in the presence of a rubbery polymer (r) to produce a graft copolymer (B); and
- blending at least 40 to 90 parts by weight of the vinyl copolymer (A) and 10 to 60 parts by weight of the graft copolymer (B), wherein
- the acetone-soluble content (C) of the thermoplastic resin composition has a dispersity (Mw/Mn) of 2.0 to 2.5, and
- in a molecular weight distribution of the acetone-soluble content (C) of the thermoplastic resin composition, the proportion of the component having a molecular weight of 250,000 or more is 15 to 30% by weight and the proportion of the component having a molecular weight of less than 50,000 is less than 30% by weight.

7. A molded article comprising the thermoplastic resin composition according to claim 1.

8. A molded article comprising the thermoplastic resin composition according to claim 3.

* * * * *